Aug. 2, 1966     K. P. FRISK     3,264,163
MACHINE FOR MANUFACTURING CAMOUFLAGE NETS
Filed Oct. 9, 1962
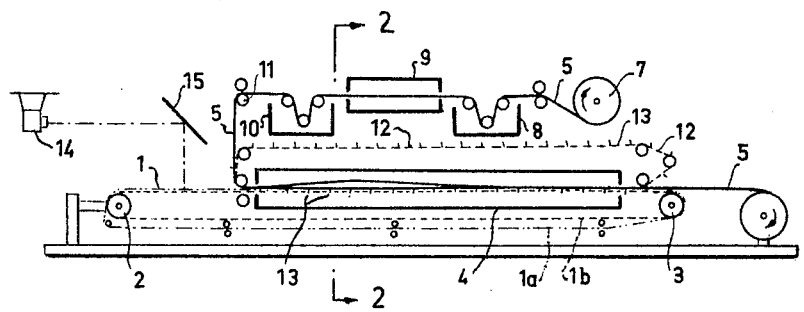
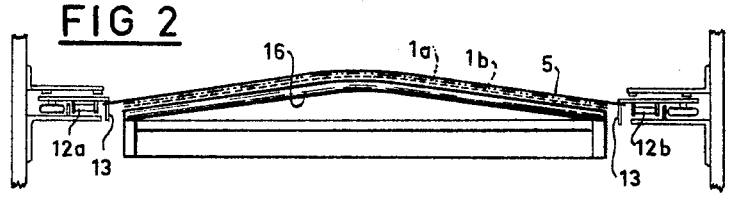
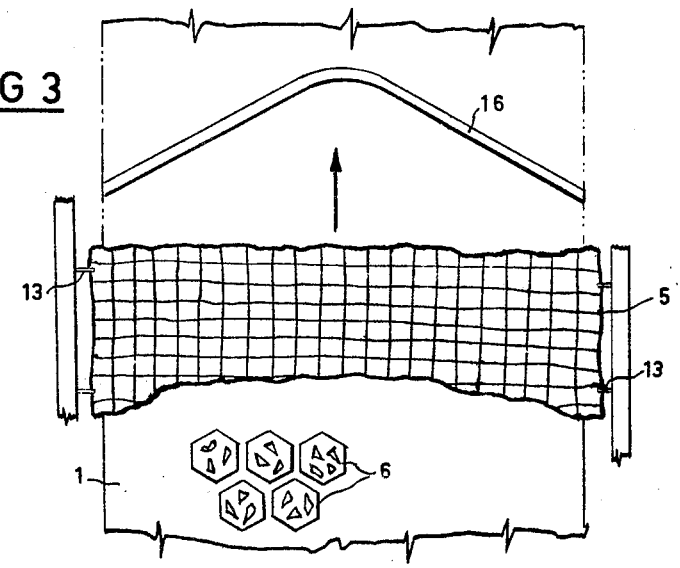

United States Patent Office 3,264,163
Patented August 2, 1966

3,264,163
MACHINE FOR MANUFACTURING
CAMOUFLAGE NETS
Karl Per Frisk, Gamleby, Sweden, assignor to Firma
Licentia, Ekman & Brundin, Stockholm, Sweden, a corporation of Sweden
Filed Oct. 9, 1962, Ser. No. 229,302
Claims priority, application Sweden, Oct. 13, 1961,
10,177/61
3 Claims. (Cl. 156—496)

This invention relates to a machine for manufacturing camouflage nets by gluing leaves of foil material to a net provided with a binder.

The net is first moved through one or more adhesive baths whereupon the leaves are pressed against the binder on the net. It is desirable to have each leaf subjected to a uniformly distributed pressure upon its entire surface such that the leaf will adhere to the net at as many points as possible.

The object of the invention is to provide a machine of the kind referred to by means of which the leaves are pressed against the net by simple and effective means which render possible continuous feeding of the net while the leaves are applied and attached to the net.

To this end the machine according to the invention is mainly characterized by an endless conveyor belt having a substantially horizontal upper part on one end of which the leaves are to be laid in accordance with the pattern which they are to form on the net, and by actuating means adapted to pull the net from a supply roll and to guide it through an adhesive bath and thereupon to move the net into contact with the upper side of the upper part of the conveyor belt along part of the length thereof, whereby to press the leaves against the net and attach them thereto by means of the binder. In the region where the net is in contact with the upper part of the conveyor belt there is provided a member which forms a hump in the path of movement of the upper conveyor part such that said upper part and the net are tightened against each other over the hump so as to press the leaves against the binder on the net.

A suitable embodiment of the machine according to the invention is diagrammatically illustrated in the annexed drawing and described more closely hereinbelow.

FIG. 1 is a diagrammatic lateral elevation of the machine according to the invention. FIG. 2 is a cross-sectional view along the line II—II in FIG. 1 of the conveyor belt and the net with intermediate leaves in the region where they are in a drying oven and tightened over the hump, and FIG. 3 a diagrammatic top view of the hump in the form of a bow shaped pipe sloping in the direction of movement of the conveyor belt and net. The last named figure also shows part of the net and part of the conveyor belt with leaves placed thereon in the form of hexagonal pieces of plastic foil.

An endless conveyor belt 1 runs over two pulleys 2 and 3. The conveyor belt consists of an outer web 1a of sack cloth and an inner supporting web of steel-wire sheeting 1b. The upper part of the conveyor belt passes through a drying oven 4.

The net 5 to which the leaves 6 are to be attached is pulled from a supply roll 7 and moved through a first adhesive bath 8, a drying oven 9 and a second adhesive bath 10 and runs over a guide wheel 11 and is then catched by an actuator strip 12 which pulls the net downwards into contact with the conveyor belt 1 and maintains the net in a laterally stretched condition when it passes through the drying oven 4 together with the conveyor belt.

The actuating means 12 consists of two endless chains 12a and 12b which are driven at the same speed as the conveyor belt and provided with hooks or dogs 13 on which the edges of the net are hooked as shown in FIG. 2.

To the left of the drying oven 4, as viewed in FIG. 1, part of the conveyor belt 1 is exposed, and on this part leaves 6 are placed in accordance with the desired pattern. In order to facilitate the application of the leaves, the configuration of the pattern is projected on the conveyor belt by means of a cine projector 14 and a mirror 15. The film in the projector corresponds to photographs taken of a running conveyor belt having the pattern marked thereon. The film is fed with a speed such that the image will appear on the conveyor belt like a check pattern printed thereon. In order to obtain synchronous driving, there are used two synchronous motors one of which is driven by the net acthating chain 12 or the conveyor belt and the other one is adapted to drive the film in the projector 14. The two synchronous motors are cross-connected such that the first named synchronous motor acts as an electric generator for driving the synchronous motor provided in the projector.

As diagrammatically shown in FIG. 1 a bulge of the conveyor belt and the net is formed within the drying oven 4. However, since the edges of the net are hooked on the dogs 13 of the chains 13, the bulge of the conveyor belt acting on the net results in that the net will be tightened against the conveyor belt, the purpose being to press the leaves placed on the conveyor belt uniformly and forcibly against the binder on the net so as to attach the leaves on the net at points as many as possible.

In order to form the bulge the conveyor belt and the net are forced up over a hump-like member which in the embodiment exemplified consists of an arcuate pipe 16 forming a cross bar beneath the upper part of the conveyor belt.

To obtain a uniform tightening of the conveyor belt and the net, the arcuate pipe 16 is inclined upwards in the direction of movement of the net as shown in FIGS. 1 and 2. Preferably, the slope of the pipe is slightly less near the highest point of the pipe, when viewed laterally, so that the pipe will have a slightly curved profile.

It is possible to use another type of hump-forming member instead of the pipe. For example, a guide vane may be devised to fulfill the same functions as the pipe 16. In this case, the vane preferably has a guide edge which extends in a manner similar to the pipe 16.

What is claimed is:
1. Machine for manufacturing camouflage nets by gluing a plurality of foil-like leaves to a net, comprising
   an endless conveyor belt having a substantially horizontal upper part; an adhesive bath; means for moving said net through said adhesive bath; means for moving a net from a supply roll into engagement with two endless conveyor chains provided on either side of said horizontal part of the cnoveyor belt and driven at the same speed as said conveyor belt;
   said chains being provided with a plurality of dog-like members for engaging the side edges of said net and stretching it transversely over said conveyor belt;
   means for feeding foil-like leaves onto the upper portion of said conveyor belt;
   said upper part of the conveyor belt having a free entrance end portion for receiving said leaves thereon in a predetermined pattern which they are to form on the net;
   a hump located in the path of movement of said upper conveyor part and net to produce contact pressure between said net and leaves against said conveyor belt, said hump consisting of an arched member having two side legs extending obliquely upwardly and inwardly in the direction of movement and meeting each other above the middle of the conveyor belt said arched member giving in each cross section of the web and net along the hump a maximum contact pressure at the two breaking points formed by the legs of the hump.

2. A machine according to claim 1 characterized in that the hump consists of a member in the form of a cross bar which is secured to the frame of the machine and forces the conveyor belt upwards toward the net.

3. Machine according to claim 1, in which said conveyor belt comprises an outer web of cloth intended to support the leaves and an inner web of steel wire netting forming a support for the outer web.

References Cited by the Examiner

UNITED STATES PATENTS

| | | | |
|---|---|---|---|
| 1,696,397 | 12/1928 | Haefely | 118—506 |
| 2,782,458 | 2/1957 | Emmert | 156—496 |

EARL M. BERGERT, *Primary Examiner.*

R. I. SMITH, M. L. KATZ, *Assistant Examiners.*